Patented Feb. 28, 1928.

1,660,561

UNITED STATES PATENT OFFICE.

ARTHUR LAMBERT, OF NEW YORK, N. Y., ASSIGNOR TO COSMIC ARTS, INC., OF NEW YORK, N. Y., A CORPORATION OF DELAWARE.

METHOD OF TREATING NATURAL ALKALINE SALTS OF SECONDARY AND TERTIARY ORIGIN.

No Drawing.   Application filed June 12, 1924.   Serial No. 719,508.

The treatment of mixtures of alkali-metal salts, such as occur in nature or are obtained in the course of various chemical processes, has presented great difficulties hitherto, and in the methods employed heretofore, the separation of certain constituents from the others has been an unavoidable step entailing considerable expense and thus increasing very materially the cost of the final product. For instance, in making soda (sodium carbonate) from substances containing sodium chlorid with other salts, the procedures employed prior to my invention required the sodium chlorid to be separated from such other salts before beginning the treatment by which sodium carbonate is obtained from the sodium chlorid. When following my process, however, the mixture containing the sodium chlorid may be treated as such for the conversion of sodium chlorid into sodium bicarbonate. It will be understood that my invention is of general application to the treatment of mixtures containing alkali-metal salts, and not only such as contain sodium chlorid.

I will now describe, as examples, a few important applications of my invention.

One of the raw materials to which my improved method may be applied with great advantage, is the solution, found in certain lakes in Mexico and other countries, of sodium chlorid, sodium carbonates, and sodium sulfate, or the dry product or salt mixture obtained by the evaporation of such solution, as may be advisable in many cases where the plant for carrying out my process cannot be located conveniently near the source of such raw material. In this natural raw material, the three salts named above are contained in about equal quantities, when dry. The first step in this example of my process consists in bringing the natural solution to a concentration of at least 28° Bé. (as by exposing it to the heat of the sun) or when the dry product is used as the starting material, preparing therefrom an aqueous solution of at least 28° Bé. This solution is then treated with ammonia and also with carbonic acid, the latter being caused to bubble through the liquid for a period of from about one-half hour to an hour. By this treatment I obtained, as a precipitate, an amount of sodium bicarbonate, $NaHCO_3$, much greater than could be accounted for by the conversion of the sodium chlorid present. The reaction with sodium chlorid may be represented by the equation:

(1) $NH_3 + NaCl + H_2O + CO_2 = NaHCO_3 + NH_4Cl$.

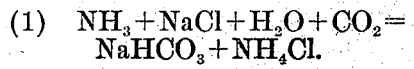

It was evident that not only the greater portion (about two-thirds) of the sodium chlorid had been converted into the bicarbonate, but the carbonate and sesquicarbonate of sodium undergo a like transformation. In the case of the carbonate, the reaction may be expressed by the equation.

(2) $Na_2CO_3 + H_2O + CO_2 = 2NaHCO_3$.

The sodium sulfate also is converted into bicarbonate, probably according to the equation.

(3) $Na_2SO_4 + 2NH_3 + 2H_2O + 2CO_2 = 2NaHCO_3 + (NH_4)_2SO_4$.

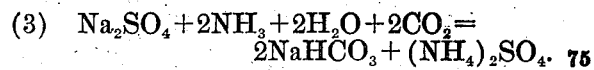

Instead of using an aqueous solution of the sodium chlorid, sodium carbonates, and sodium sulfate, I may dissolve ammonium carbonate in the same water with said salts, whereby ammonia and carbonic acid will be liberated, to produce the reactions explained above. Or instead of employing ammonium carbonate, I may dissolve the dry product obtained as set forth, in ammoniacal brine, and then bubble carbonic acid through the resulting solution, with the same result as explained above in connection with equations (1) (2) and (3).

In each case, the resulting product is about 98% $NaHCO_3$.

I will now give a second example of my invention in which no ammonia is employed. After concentrating a natural solution such as referred to in connection with the first example, to 28° Bé., or preparing from a corresponding dry product used as the starting material, a solution of at least 28° Bé., the solution is brought into contact with carbonic acid, by causing the solution to descend, in the form of a spray, within an ascending current of rich carbonic acid gas, in a tower partly filled with stones, after the fashion of the customary towers operating on the countercurrent principle. The reaction may cause the temperature to rise to from 35° to 45° centigrade, but the temperature of the apparatus should be properly regulated so that the liquid will at the time of its discharge have a temperature of about 33.3°. To insure this result, the apparatus may be provided with suitable temperature regulating devices, such as a water-jacket of any well known or approved character, so that by circulating hot or cold water the temperature may be maintained at the desired point. As the result of this treatment with carbonic acid gas I obtain a very high yield of sodium bicarbonate $NaHCO_3$, after the operation has been continued for a period of from 20 minutes to three-quarters of an hour. The reaction may take place either in a chamber open to the outside air, or in a closed space under a pressure greater than atmospheric.

I find that under the conditions described, the carbonate and sesquicarbonate of sodium present in the solution are converted into the bicarbonate, in accordance with the reaction mentioned above, see (2). The sodium chlorid and the sulfate, however, remain substantially unaltered, and an important problem is to separate them from the sodium bicarbonate, which is a precipitate in suspension in the liquid. I have found that such separation can be effected readily by taking advantage of the fact that sodium sulfate has its maximum solubility in a liquid of 33.3° centigrade. Therefore, by discharging the liquid (with the bicarbonate suspended therein) from the tower or other treatment chamber, at a temperature of about 33° into a filter or other separating apparatus, and conducting the filtration or equivalent operation at approximately said temperature, I cause the greater portion of the sodium sulfate (and the sodium chlorid) to pass off with the mother liquor, while the bicarbonate is retained by the filter. The deposit or precipitate thus retained is then preferably washed at 33° either with lukewarm water, or with a saturated aqueous solution of bicarbonate of sodium. A further amount of sodium sulfate is thus removed from the precipitate, so that a very high grade sodium bicarbonate (98%) is obtained as the final product. To enable the temperature to be properly controlled during filtration and during the subsequent washing, it is desirable to provide the filter with a jacket through which water or other fluid of proper temperature may be circulated.

The treatments described above give good results when applied to the natural solutions, but are frequently unsatisfactory when used on the dry material obtained by evaporation of the natural solutions and crystallization, such material being shipped to a treatment plant, and crushed or ground and then dissolved at destination. The unsatisfactory results, in these cases, are due to the changes which occur if considerable time intervenes between crystallization and subsequent solution of the crystals, say owing to a long journey from the place where the natural solution is evaporated to the place where the evaporated dry product is dissolved for the treatment described above. Such delay causes a large proportion of the sulphate to become anhydrous, and in that condition it is very hard to eliminate. I have therefore devised another form or species of my invention, which is as follows:

The natural solution found in certain lakes, as referred to above, is first concentrated (as by the effect of solar heat) to 28° Bé. or more, the temperature of the liquid attaining 50° centigrade and more. The solution is then transferred to separate apparatus, in which it is cooled to 33.3° (that is, the temperature at which the largest amount of sodium sulfate is dissolved). The liquid is preferably stirred, as this greatly facilitates precipitation of the bicarbonate. Subsequent filtration or equivalent separating treatment causes the carbonates to be recovered as solids, while the detrimental sodium sulfate passes off with the mother liquor. The filtration is carried out at about 33°, and the same temperature is employed for any subsequent washing of the precipitated bicarbonate. After washing, the precipitate is dried in the filter by suction, removed from the filter, and then calcined to convert it into neutral carbonate. The solid thus obtained may be sold to ranchers (who use it for cattle) or it may be shipped for use in making various products, such as caustic soda and soda crystals, which do not require 98% soda as starting material. The product resulting from this form of my process is from 95 to 96% pure sodium carbonate. It is of smaller volume than the usual crystalline product, and may therefore be shipped at very low cost. This particular form of my process is very economical, as it involves no expensive steps, no treatment with ammonia, or with carbonic acid, no electrolysis, and no Leblanc method.

It will be understood that the drying and calcining of the washed product may be employed, in the same manner as described above, in conjunction with the other forms of my invention set forth herein.

Another species of my process is as follows: A natural solution of the character referred to above, or a solution prepared from the evaporated product of such natural solution is subjected to crystallization, followed by aqueous fusion (that is to say, fusion without driving off the water of crystallization) and subsequent precipitation of sodium sulfate and sodium chlorid, thereby obtaining high grade granular soda.

In the examples of my invention given above, the raw material consists (practically) only of sodium salts. The invention, as has been stated is of much more general application. For instance, it is applicable with great advantage to natural potash material such as the potash salts mined in Alsace. While their composition varies considerably they all contain a substantial proportion (from about 24 to 35%) of potassium chlorid and a still greater proportion (from about 50 to 65%) of sodium chlorid, these two salts together constituting from 84 to 90% of the mineral, and the remaining 10 to 16% being made up of various substances, among which there is calcium sulfate amounting to from .18 to about 3.5% of the raw material. This material has been worked hitherto for the treatment of potassium chlorid exclusively, the sodium chlorid being discarded. This waste is avoided by my process. The treatment I am about to describe is applicable not only to Alsatian potash, but to any other natural or industrial product containing potassium chlorid and sodium chlorid, as well as to certain other substances, as mentioned below.

From this material or product, I prepare a solution in any one of the ways explained in connection with the first example of my invention, and obtain a reaction with ammonia and carbonic acid, either by bubbling, or in any one of the other manners set forth in conjunction with said first example. This treatment will convert the sodium chlorid into a precipitate of sodium bicarbonate, as hereinbefore explained, see equation (1). The calcium sulfate (in the case of Alsatian potash) remains unchanged and does not affect the reaction. Potassium chlorid is altered but little, and passes off with the mother liquor. Whatever change occurs in a small portion of the potassium chlorid, consists in the formation of salts more soluble than the corresponding sodium salts, so that these potassium salts will remain in the mother liquor. The latter is evaporated, for instance in apparatus of the Kestner type, resulting in the production of a fertilizer, a mixture containing chiefly potassium chlorid and ammonium chlorohydrate. This fertilizer is produced at low cost, since waste steam or waste hot vapors are generally available to supply the heat required for this evaporation. Any unconverted sodium chlorid is returned to the original solution, for further treatment.

The species of my process just described is also applicable to solutions containing (in addition to potassium chlorid and sodium chlorid) salts such as potassium sulfate, which remains unchanged, or magnesium chloride (contained for instance, in Stassfurt potash minerals) since this chlorid is not affected. As further examples of materials that may be treated according to this species of my process, I will mention solutions of salts obtained by the evaporation of salt marsh waters, solutions of calcined or fermented algæ, or various complex alkali-metal salt solutions such as occur in certain chemical processes. This species of treatment is also applicable to raw sodium nitrate (Chile nitrate caliche) carnallite, sylvinite, etc.

However, for the treatment of Chile nitrate, I prefer the following special form of my process. It is well known that Chile nitrate has, as its chief constituents, sodium nitrate, sodium chlorid, and sodium sulfate (the latter combined with water). The treatment employs both ammonia and carbonic acid as the reactive chemicals, and may be conducted in substantially the same manner as in the first example of my invention, and either in apparatus open to the atmosphere, or under a pressure greater than atmospheric. The solution treated is however brought to a higher degree of concentration than in the first example, say 38° Bé. instead of 28° Bé. A slight excess of ammonia is employed, this excess being intended to start the decomposition of the sodium nitrate, while the main portion of the ammonia decomposes the sodium chlorid (equation (1.)). In this particular treatment, not only the sodium chlorid is converted into bicarbonate (equation (1) (2)), but a large proportion (from 75 to 80%) of the sodium nitrate as well is transformed into sodium bicarbonate. The reaction produces a certain amount of ammonia from the nitrate and thus enables me to use less ammonia than would be required otherwise. It will be noted that this ammonia obtained from the nitrate, is extracted from a natural product (caliche) and its cost is much lower than that of ammonia obtained by other processes and particularly by synthetic methods. As in the second example of my invention, care is taken to have the solution discharged from the treatment apparatus (in which the reaction may cause the temperature to rise as high as 40° or 50°) to the filter or other device for separating the precipitate, at a temperature of about 33.3°, so that as much of the sodium sulfate as possible will be carried away dissolved in the mother liquor. The latter also contains ammonium chlorhydrate, ammonium nitrate, and free ammonia, besides other products. The sodium sulphate is thus eliminated as much as possible. Any salts which result from double decomposition may be recovered in suitable apparatus, for instance, of the Kestner type. The free ammonia is readily recovered and constitutes a valuable by-product obtained at very low cost. The precipitate (sodium bicarbonate) retained by the filter may be washed in the manner set forth above, and then dried by air suction, and calcined as previously explained.

My invention may be applied to the treatment of liquids or solutions containing complex (double or triple) salts of the alkali metals, for instance, double chlorids such as that of aluminum and sodium, or that of magnesium and potassium, or triple chlorids, such as the one of mercury, copper and potassium.

In cases where the natural product or solution should contain certain ingredients in smaller amount than required for the desired transformation (for instance into sodium bicarbonate) I would add a sufficient amount of such ingredients (for instance sodium chlorid) to make up the deficiency.

One of the great advantages of my invention is that it provides a practical process for utilizing commercially a number of products which have been considered hitherto as of little or no value.

It will be understood that in special cases, where a plurality of salts are obtained as the result of my process, I may separate these salts by any well known or approved method.

The various products obtained by my process may serve as starting materials for the manufacture of divers chemicals. For instance, the ammonia may be used for the manufacture of nitric acid, and hydrochloric acid may be made with the aid of the chlorids found among the residual products of my process.

Various modifications may be made without departing from the nature of my invention as set forth in the appended claims.

I claim:

1. The process which consists in subjecting a 28° Bé. solution containing sodium chlorid, sodium carbonate, and sodium sulfate to the action of ammonia and carbon dioxid to recover from said alkali salts sodium bicarbonate, and separating the latter from the mother liquor.

2. The process which consists in subjecting a 28° Bé. solution containing sodium chlorid, sodium carbonate, and sodium sulfate to the action of carbon dioxid to convert the carbonate into bicarbonate, discharging the remaining mother liquor, with the sodium bicarbonate suspended therein, at a temperature of about 33° centigrade, and separating the bicarbonate from said liquor at said temperature.

3. The process which consists in subjecting a 28° Bé. solution containing sodium chlorid, sodium carbonate, and sodium sulfate to the action of carbon dioxid to convert the carbonate into bicarbonate, discharging the remaining mother liquor, with the sodium bicarbonate suspended therein, at a temperature of about 33° centigrade, separating the bicarbonate from said liquor at said temperature, and then washing the bicarbonate, at said temperature, with a solvent selective to sodium sulfate.

4. The process which consists in cooling a solution containing sodium chlorid, sodium carbonate, and sodium sulfate to a temperature of about 33° centigrade, and separating the suspended precipitate from the mother liquor.

5. The process which consists in cooling a solution containing sodium chlorid, sodium carbonate, and sodium sulfate to a temperature of about 33° centigrade, agitating the liquid, and then separating the suspended precipitate from the mother liquor.

6. The process which consists in subjecting a solution containing sodium chlorid, sodium carbonate and sodium sulfate to the action of ammonia and carbon dioxid, and separating the resulting precipitate from the mother liquor.

In testimony whereof I have affixed my signature.

ARTHUR LAMBERT.